April 10, 1951      C. P. MOLYNEUX      2,548,230
WELDING MASK
Filed June 27, 1946      5 Sheets-Sheet 1
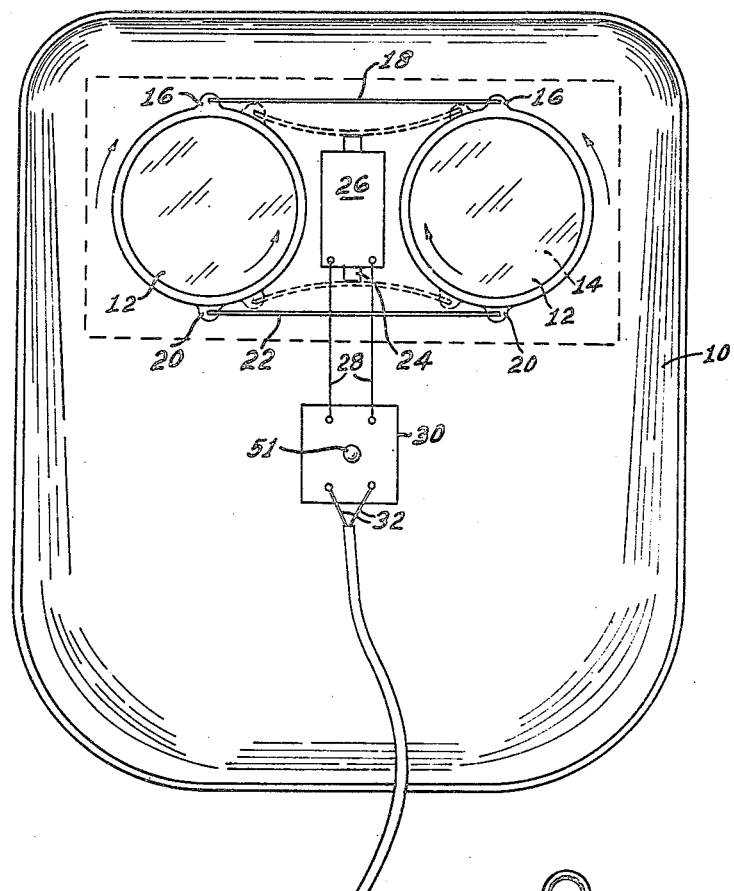
FIG. 1
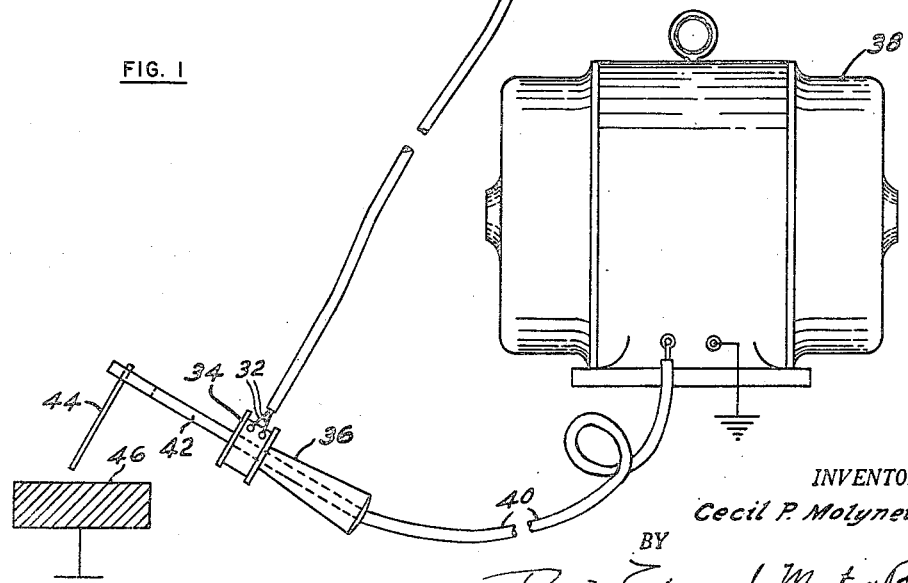
INVENTOR.
Cecil P. Molyneux
BY
Pennie, Edmonds, Morton & Barrows
ATTORNEYS April 10, 1951 C. P. MOLYNEUX 2,548,230
WELDING MASK
Filed June 27, 1946 5 Sheets-Sheet 5
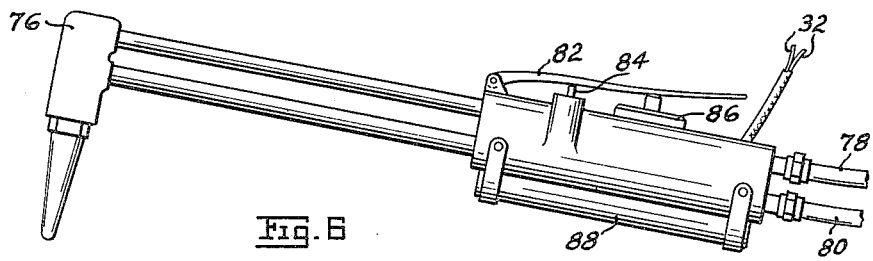
Fig. 6
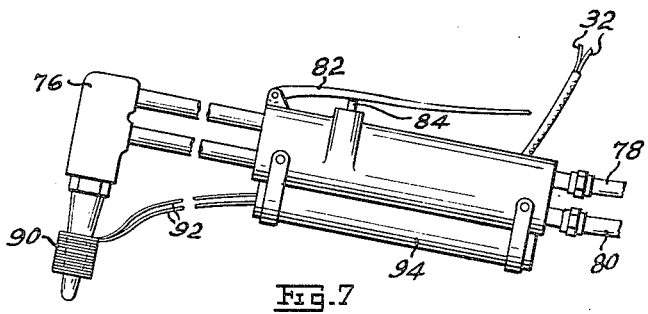
Fig. 7
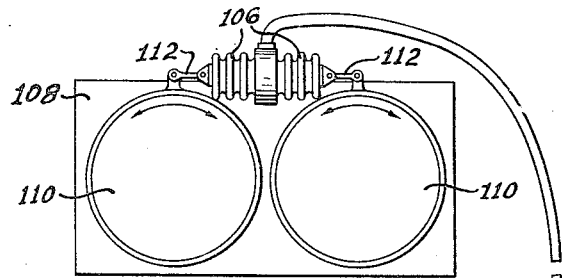
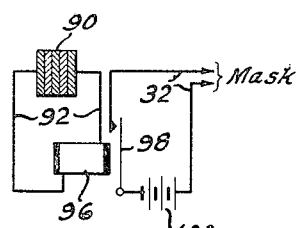
Fig. 8
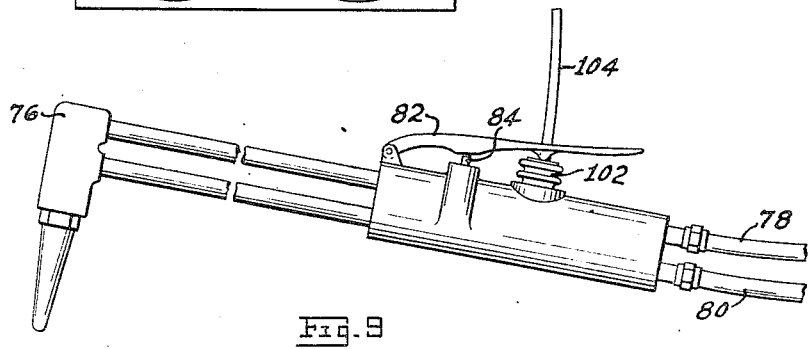
Fig. 9
INVENTOR
Cecil P. Molyneux
BY
Pennie, Edmonds, Morton & Burrows
ATTORNEYS Patented Apr. 10, 1951

2,548,230

UNITED STATES PATENT OFFICE 2,548,230

WELDING MASK

Cecil Patrick Molyneux, Hampton Bays, N. Y., assignor to Molyneux & Aspinwall, Inc., Flushing, N. Y., a corporation of New York Application June 27, 1946, Serial No. 679,655

8 Claims. (Cl. 2—8)

My invention relates to improvements in welding masks and more particularly to an automatic mask provided with an optical system which is responsive to variations in the welding current or to the intensity of the flame or arc for varying the light transmitted to the eyes of the welder.

Conventional welding masks are provided with colored lenses which exclude so much light that it is difficult for the welder to see the particular work to be welded while wearing the mask, except when the welding arc has been struck. Under such circumstances it will be understandable that the welder is constantly lifting and lowering his mask. Some welding masks are provided with lenses which may be changed in accordance with the type of welding to be done. Jobs which require a heavy electric current producing an arc of great brilliancy necessitate the use of deeply colored lenses, whereas an arc of low brilliancy may require lenses of a lighter color or tint in order for the welder to see the work when the arc has been struck.

Various proposals have been made with respect to automatic welding masks which provide a movable screen or shutter of colored glass which is automatically moved in front of the welder's eyes when the welding current is turned on or the welding operation is started by striking the arc. The apparatus usually included in such proposals comprises an electrically operated shutter which is raised or swung over the eye pieces of the mask by means of a solenoid. In some cases the colored screen or lenses are moved over the eye piece of the mask by the operation of a spring while a solenoid reverses the operation when the welding is discontinued. In all these proposals there is a change from maximum light transmission to minimum light transmission so that the welder must have the full arc in order to see the work on which he is operating.

I have discovered that an improved welding mask may be provided which includes an optical system which will give a level of vision proportional to the brilliancy of the arc or flame created by the welding device. In the use of this device the welder will find no need for making manual adjustments in the lenses or of changing lenses for different types of welding or cutting. Furthermore, his hands will be free to handle the welding equipment and at the same time his vision will be kept at a substantially constant level so that he will be able to produce a better welding job than otherwise would be possible.

The primary object, therefore, of the present invention is to provide an improved welding mask construction adapted to control the amount of light passing through the lenses of the mask in accordance with the intensity of the light produced by the welding arc or flame.

Another object of my invention is to provide an improved welding mask in which light passing through the lenses has a direct relationship to the welding current flowing through the welding apparatus.

A further object of the invention is to provide an improved welding mask adapted to give a substantially constant level of vision for the operator regardless of the changes in brilliancy of the welding arc or flame.

In accordance with the features of my invention, the improved welding mask comprises an optical system and automatic control mechanism adapted to continuously vary the transmission of light to the operator's eyes in response to variations in the current or fuel used in the welding operation whereby the operator will have a maximum degree of visibility in conducting the welding job.

According to a preferred construction my improved welding mask includes a pair of eye pieces each of which is composed of a pair of polarizing lenses, at least one of which is rotatable. The lenses of each eye piece in a specific form of the invention are mounted for relative rotation with respect to each other so as to vary the light transmission through the eye piece. Means is provided for normally retaining the lenses of each eye piece in a position for maximum transmission of light while automatic means responsive to variations in the operation of the welding apparatus is provided for rotating the lenses from their normal position in order to vary the light transmission.

In a preferred construction an electrical means for operating the lenses is arranged so as to be operated by a variable current, the variations of which correspond to the variations in the welding current flowing to the welding device.

According to a specific construction the welding current for operating the lenses of the mask is a current induced in a circuit by the welding current flowing to the welding device.

My invention includes other objects, features and advantages which will be apparent to those skilled in the art from the following more detailed description taken in connection with the accompanying drawings in which:

Fig. 1 is a front elevational view of a welding mask constructed in accordance with the features of my invention, the view showing diagrammatically the mask in its association with a welding device and means for supplying welding current.

Fig. 6 is a side elevational view of a gas welding or cutting torch equipped with an electrical system responsive to variations in the gas flow for operating the lenses of a welding mask such as shown in Figs. 1, 3, and 4.

Fig. 7 is a view similar to that of Fig. 6 showing a torch with a modified form of electrical system.

Fig. 8 is a wiring diagram of the electrical system shown in connection with the torch of Fig. 7.

Fig. 9 is a diagrammatic view, showing a welding or cutting torch provided with a pneumatic system for operating the lens of a welding mask.

Figure 2:
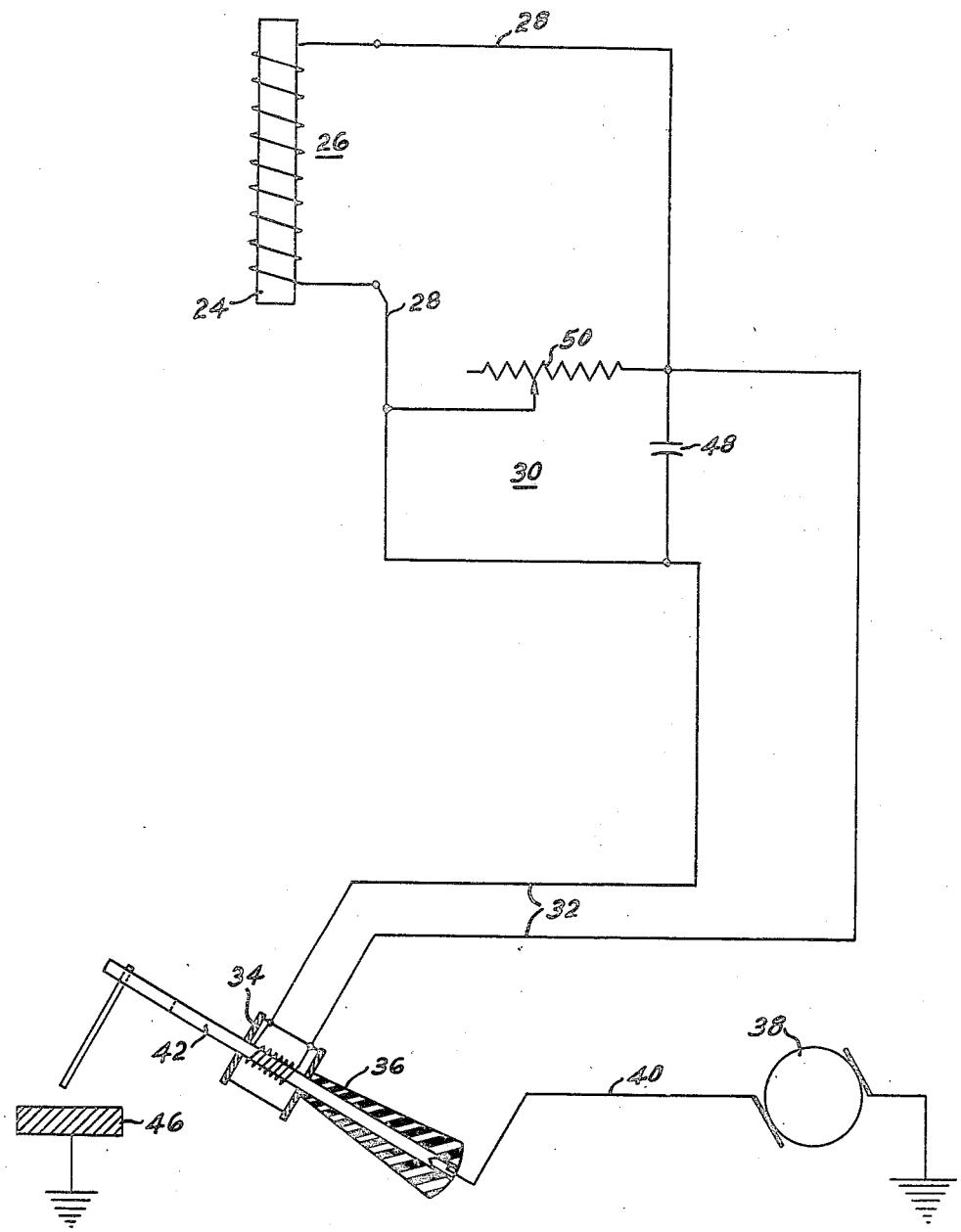
Fig. 2 is a wiring diagram for the apparatus shown in Fig. 1.

Referring to Fig. 1 of the drawings the improved apparatus there shown comprises a hood 10 which is merely shown diagrammatically and which may have any desired form adapted to protect the face of the wearer. The hood 10 may include suitable hood straps or other mechanism for supporting the hood on the wearer in accordance with the usual procedure.

The hood 10 carries an optical system, each eye piece of which includes front and back light polarizing (compare Fig. 4) lenses 12 and 14, the front lenses 12 being mounted in rims provided with upwardly projecting ears 16 which are connected together by a light steel spring 18. The back lenses 14 are provided with downwardly projecting ears 20 which are connected by a light steel spring 22 which is similar to the spring 18. The mounting for the optical system may be similar to that shown in Figs. 3 and 4, and is represented by a dotted line rectangle.

The springs 18 and 22 are mounted opposite each other respectively above and below the position of the lenses. An electro-magnet 24 is mounted between the springs 18 and 22, the mounting shown at 26 including a winding for the magnet which is connected through lead wires 28 to a resistance-capacitor 30 which in turn is connected by lead wires 32 to a winding or transformer 34 mounted around the conductor passing through an electrode holder 36.

Current is supplied to the electrode holder 36 for welding purposes from a generator 38 through a conductor 40, the generator being grounded as shown. The electrode holder 36 may be of any form of construction which for example is provided with a heavy metal conductor 42, to which the current line 40 is attached and to which an electrode or welding rod 44 is connected for conducting a welding operation. In Fig. 1 the electrode holder 36 is shown in relation to a workpiece 46 which represents the metal to be welded and which is grounded as shown in accordance with the usual practice.

In the use of the apparatus shown in Fig. 1 the operator carries the welding mask and begins his welding operation by grasping the insulated handle of the electrode holder. Before the welding operation has started the operator can see through the optical system comprising the polarizing lenses 12 and 14 with full vision since they are mounted in relation to each other so that the polarizing material is oriented to allow maximum light transmission. The welder, therefore, can see the job to be done with the mask down over his face. The instant a current flow is initiated by bringing the welding rod 44 close to the workpiece 46 a current is induced in the winding of the element 34 and transmitted through the lead lines 32 to the resistance hook-up 30 and then through the lead lines 28 to the winding of the electromagnet 24. The induced current flowing in this manner effects a pull on the light steel springs 18 and 22 thereby relatively rotating the lenses 12 and 14 of each eye piece. It will be noted that when the middle of the light spring 18 is pulled down the lenses 12 will be rotated in the direction of the outside arrows. At the same time when the light spring 22 is pulled up by the electromagnet 24 the lenses 14 will be rotated in the direction of the inside arrows. The dotted line positions of the springs 18 and 22 and ears 16 and 20 show the maximum rotation which is arranged to give the maximum density desired for the optical system, i. e., the minimum light transmission.

The passage of a relatively low current through the electrode holder 36 will induce a relatively weak current in the element 34 so that the lenses 12 and 14 will be rotated only slightly so as to decrease the light transmission in proportion to the brilliancy of the arc being used in the welding operation. As the current flowing through the electrode holder increases the induced current in the element 34 also increases thereby increasing the pull on the electromagnet 24 to increase the rotation of the lenses 12 and 14. As the current increases, more and more light is cut out by the optical system so that the operator's eyes are protected. At the same time the operator is able to see the work at approximately the same level of vision regardless of the intensity of the arc.

Fig. 2 of the drawings shows more in detail the wiring diagram of the apparatus illustrated diagrammatically in Fig. 1. In Fig. 2 it will be seen that the transformer type of element 34 comprises a winding around and insulated from the heavy conductor 42, the winding being connected to the leads 32. The resistance-capacitor 30 includes a condenser 48 connected between the leads 32, and a variable resistance 50 connected up in parallel with the condenser. The resistance 50 may be of the rheostat type provided with suitable operating means such as a knob 51 shown in Fig. 1. The leads 28 are directly connected from the unit 30 to the coil wound around the electromagnet 24.

The apparatus as shown in Figs. 1 and 2 may be used without the current adjusting means 30 by selecting the electromagnet 24 and the springs 18 and 22 in relation to each other and to the normal range of current induced in the element 34. However, the preferred form of the apparatus includes the current adjusting means 30 which in turn serves to adjust the amount of light transmitted through the optical system for a given current flowing through the electrode holder, or for a given arc brilliancy.

Figure 3:
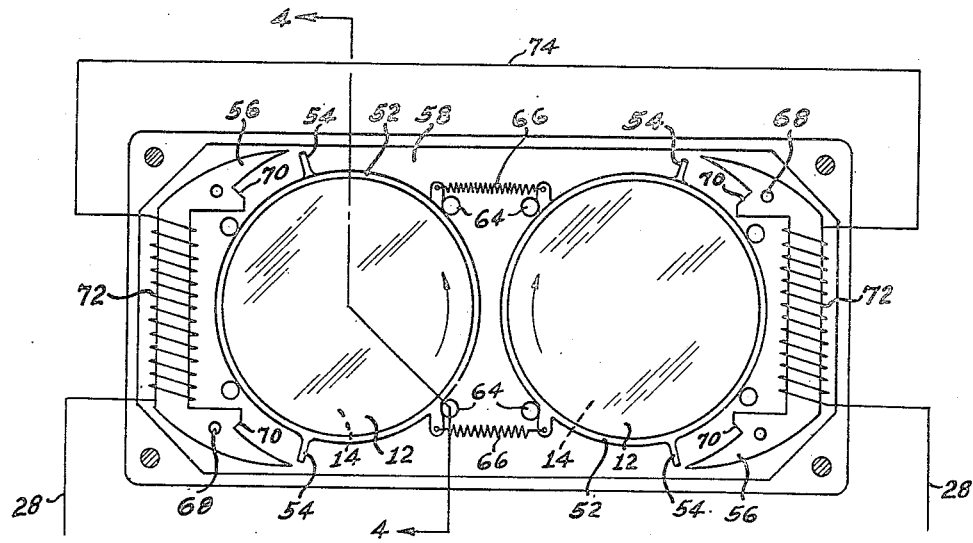
Fig. 3 is a front elevational view of a modified form of eye piece construction with parts removed to show the internal arrangement of the lenses and operating mechanism.
Figure 4:
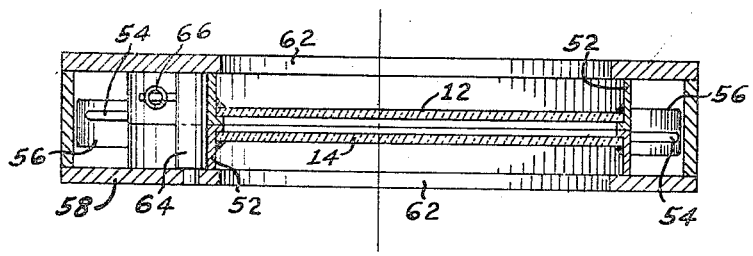
Fig. 4 is a vertical, sectional view taken on the irregular line 4—4 of Fig. 3.

Figs. 3 and 4 of the drawings show a modified form of optical system and mounting which may be used on a hood of the type 10 shown in Fig. 1 and which would occupy approximately the position of the rectangular mounting shown in dotted lines in Fig. 1.

In Figs. 3 and 4 the superimposed lenses 12 and 14 of light polarizing material are mounted in rims 52 which bear against each other as shown in Fig. 4, each rim including a projecting iron or steel lug 54 arranged to be attracted by an electromagnet 56 of the form shown in Fig. 3. The lugs 54 of the lenses 12 project down while those for the lenses 14 project up. The lenses are mounted on a backplate 58 and are covered by a front plate 60, these plates having matching eye piece openings 62 which are covered by the lenses of the respective eye pieces. Each pair of lenses is held in place by means of 4 pegs on pins 64 extending between the plates 60 and 58 and fixed to one of the plates by suitable means such as that shown in Fig. 4.

The lenses 12 as shown in Fig. 3 are connected by a light coil spring 66 as are also the lenses 14. These springs are attached to small ears or lugs on the rims 52 and are adapted to normally maintain the lenses so that the lugs engage the inner pins 64.

The lenses 12 and 14 are arranged with the iron lugs 54 of the lenses 12 below and the corresponding lugs of the lens 14 above so that they may be drawn toward the inwardly extending ends of the electromagnets 56. It will be noted that each electromagnet is held in place by means of a pair of pins or screws 68, and that each magnet includes an arm extending toward the respective lugs 54. Each arm includes a stop shoulder 70 against which the corresponding lug 54 is drawn when the maximum current is flowing through the electrode holder, this corresponding to a maximum brilliance for the arc. Each of the electromagnets 56 is provided with a winding 72, and they are connected up to the leads 28, the same as in Fig. 1. The windings 72 are connected by a lead wire 74 so that current flows in series through the two windings of the electromagnets 56.

The optical system shown in Figs. 3 and 4 is wired the same as that shown in Fig. 1 except of course that two windings are required for the two electromagnets. Springs 66 hold the lenses in the position for maximum light transmission whereas the light transmission is decreased as the current passing through the electromagnets is increased thereby drawing the lugs 54 toward the shoulders 70. The springs 66 are selected in accordance with the requirements of the particular system in correlation to the strength of the electromagnets and the current normally used for their operation.

Figure 5:
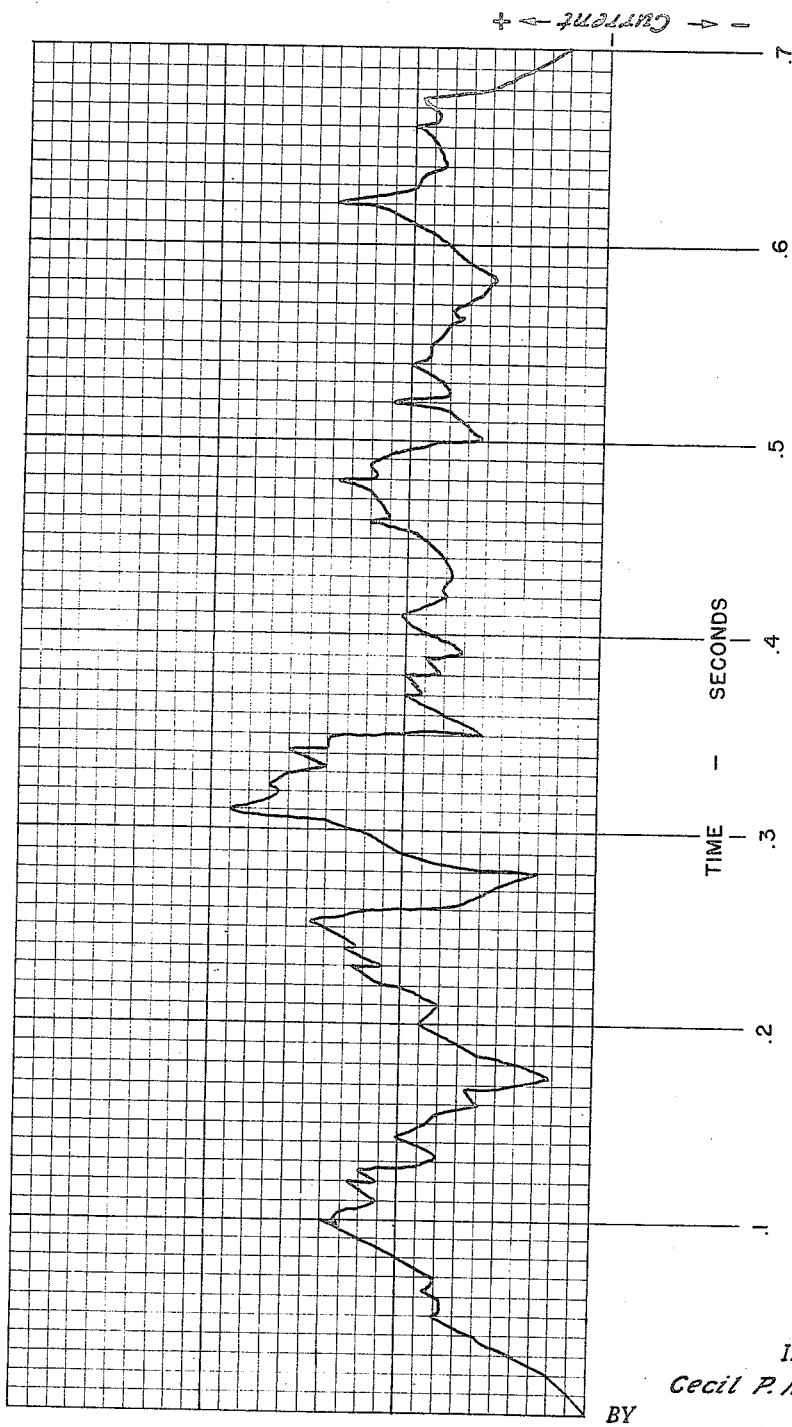
Fig. 5 is a view of a chart illustrating the manner in which a direct welding current fluctuates.

The apparatus of the present invention may be used in connection with either A. C. or D. C. welding current. The fluctuating character of A. C. current is generally understood and this fluctuation will vary the current induced in the coil of the element 34. D. C. current also fluctuates and in practice very rapidly as shown in the graph of Fig. 5, in which the main time divisions are in tenths of seconds. The current in a welding circuit whether A. C. or D. C. is therefore a fluctuating uni-directional current which causes the concentric magnetic lines of force surrounding the conductor 42 to build up and collapse rapidly. The lines of force thus varying the magnetic field of the inductor 34 thereby inducing a correspondingly varying electromotive force which operates the solenoid 24 or the solenoids or electromagnets 56 in direct relationship to the welding current. The apparatus operates equally well therefore on either direct or alternating current welding circuits without any modifications of the mask or of the welding circuit relays or other equipment employed. The induced current flowing through the leads 32 of the apparatus is of very low value so that there is no danger to the operator, there being no direct connection between the electrical system for operating the optical system of the mask and the current flowing through the electrode holder, except of course for the small induced current produced by the inductor 34.

The lenses 12 and 14 may be of known types for polarizing light as for example the type known as "Polaroid" lenses. In lenses of this character the light passing through one lens is polarized in one plane whereas the light passing through the superposed lens is polarized in a different plane. When these lenses are interposed one upon the other, the amount of light passing therethrough will depend upon the relationship between their respective planes of polarization as is well understood by those familiar with polarizing lenses. The rotation of one of the lenses or of both will vary the light transmitted therethrough depending upon the degree and direction of rotation. The lenses of the eye pieces shown in Figs. 1, 3 and 4 are therefore combined in such a way that they are normally in a position to give maximum light transmission, while their rotation by the solenoids is adapted to decrease the light transmission.

The optical system provided by the invention therefore is an effective light gate which is directly controlled by the electric current passing through the solenoid or solenoids. While in the specific illustrations of the invention shown in Figs. 1, 3 and 4 both lenses of each eye piece are rotated, one lens of each eye piece may be mounted in a fixed position while the other is rotated as shown in Fig. 9.

In Fig. 6 means is provided for operating a variable light transmitting lens system of a welding mask, such as shown in Fig. 1, simultaneously with the operation of a gas welding or cutting torch. The torch 76, is provided with the usual fuel gas line 78 for supplying acetylene or other fuel gas and the usual oxygen or air line 80. Both of these lines may include the usual cut-off valves not shown. The torch also includes the conventional control lever 82 for operating a valve pin 84 to increase or decrease the flame of the torch. The elements for controlling the lens system in response to the operation of the lever 82 comprises the lead lines 32 connected to the welding mask and to a switch 86 preferably a rheostatic switch. The lines 32 and switch 86 are connected into an electric battery 88 carried on the welding torch.

The operation of the apparatus shown in Fig. 6 when connected up to a mask having the construction shown in Figs. 1, 3 and 4 varies the light transmission through the lenses in accordance with the intensity of the flame, since as the lever 82 is pressed down by the operator to increase the flame of the torch this lever also presses the button of the switch 86 to increase the current supplied from the battery 88 through the lead lines 32 thereby energizing the electromagnet 24 to rotate the lenses 12 and 14. The switch 86 is preferably arranged so that it is in an off position when the torch 76 merely has a low or pilot flame.

The apparatus shown in Fig. 7 includes a gas torch 76 of the same construction as that shown in Fig. 6 except for a difference in the control mechanism for the mask. In this instance the tip of the torch 76 is provided with a thermoelectric pile 90 mounted adjacent the point where the flame is generated. This pile may be of conventional construction so that as it is heated by the flame an electric current is generated and sent through lead lines 92 into a control apparatus 94 including a battery which is connected up to the lead lines 32 in accordance with the wiring diagram shown in Fig. 8. In this diagram the lead lines 92 connect into the winding of a solenoid 96 which when operated closes a switch 98 to send a current from a battery 100 through the lead lines 32 for operation of the solenoid 24 of the welding mask 10.

According to the arrangement shown in Figures 7 and 8 the battery 100 would operate the lenses 12 and 14 to minimum light transmission upon the closing of the switch 98. This switch, however, may be of a rheostatic type so that the strength of the current sent to the solenoid 24 varies in accordance with the current produced by the thermoelectric pile 90. The more intense and brilliant the flame from the torch 76, the greater will be the temperature of the pile 90 and, therefore, the greater the current sent to the solenoid 96, and the current sent to the solenoid 24.

Fig. 9 of the drawings shows a further modified form of the invention in which the torch 76 has substantially the same construction as that shown in Fig. 6, except that the handle 82 operates a pneumatic bellows 102 which is connected up by a hose 104 to the lens operating mechanism. It will be noted that as the lever 82 is pressed down to increase the flame of the torch the bellows 102 is correspondingly collapsed thereby sending the pneumatic fluid through the hose 104 to expand a pair of bellows 106 mounted on a welding mask. In this instance the lens system of the welding mask may include a fixed Polaroid glass plate 108 on which are superimposed a pair of rotatable Polaroid lenses 110 which may be mounted in any suitable manner for rotation such as that shown in Figs. 3 and 4. The bellows 106 are respectively connected by a link 112 to ears or lugs on the upper portion of the rims mounting the lenses 110.

When the lever 82 of the gas torch is pressed down to increase the flame the pneumatic fluid driven through the line 104 by the bellows 102 expands the bellows 106 to rotate the Polaroid lenses 110 thereby decreasing the light transmission through the lens system. The bellows 102 is preferably in normal position when expanded while the bellows 106 are in normal position when contracted, so that the lens system returns automatically to maximum light transmission when the lever 82 is released. The bellows 102 and 106, therefore, may be spring bellows or provided with springs to accomplish the operation as described.

In all modifications of the apparatus of the present invention the gradually variable lens system of the welding mask is automatically responsive to either a current generated by the operation of the welding equipment in a welding or cutting operation or responsive to the control mechanism for operating the welding or cutting apparatus. The combination provided by the use of polarizing lenses with automatic control from the welding equipment provides an improved welding mask which gives maximum protection for the operator and at the same time provides a level of vision which is substantially constant regardless of the intensity of the welding arc or flame. If the arc or flame becomes less intense the control means slacks off and permits the lenses to transmit more light.

From the foregoing description it will be apparent that certain modifications may be made in the details of construction and arrangement of certain elements of the apparatus. Such changes are contemplated as coming within the spirit and scope of the invention as defined by the appended claims.

What I claim as new is:

1. In a welding mask associated with an electric arc welding device, a set of eye pieces of variable light transmission, means associated with the eye pieces for gradually varying the amount of light passed therethrough, and means directly responsive to variations in the current flowing in the welding device for operating the means associated with the eye pieces to thereby vary the amount of light passing through the eye pieces during a welding operation in accordance with variations in the current flowing to the welding device.

2. In an apparatus for shielding and protecting the eyes of a welder in the operation of an electric arc welding device, an electric arc welding device, means for supplying and conducting direct current to the welding device, a welding mask having a pair of eye pieces operable for varying the light transmission therethrough, means for normally retaining the eye pieces for the maximum transmission of light, electrical means for operating said eye pieces to decrease the light transmission therethrough, an inductor operatively associated with the means for supplying and conducting direct current to the welding device, said inductor being adapted to produce an induced current by the flow of said direct current through said conducting means, and means for conducting current induced in said inductor to the electrical means for operating said eye pieces.

3. In an apparatus as defined by claim 2 in which said inductor comprises means for producing an induced electrical current of variable intensity in response to variations in the intensity of the direct current flowing to the welding device.

4. In an apparatus for shielding and protecting the eyes of a welder in the operation of an electric arc welding device, an electric arc welding device, means for supplying and conducting current to the welding device, a welding mask having a pair of eye pieces operable for gradually varying the light transmission therethrough, means for normally retaining the eye pieces for the maximum transmission of light, electrical means for operating said eye pieces to gradually decrease the light transmission therethrough, an induction coil wound around the conductor for supplying current to the welding device, and means for conducting current induced in said induction coil by said conductor to the electrical means for operating said eye pieces.

5. In combination with a device for welding and cutting metals, means for conducting a light-and-heat-producing agent to such a device, a means for protecting the eyes of the operator of said device having a pair of eye pieces each of which includes a pair of light polarizing lenses superimposed one upon the other, at least one of the lenses of each eye piece being rotatable on its axis and mounted for rotation with respect to the other lens of the eye piece for varying the light transmission through the eye piece, mechanical means for normally biasing the rotatable lens of each eye piece toward a position for maximum transmission of light therethrough, and means for rotating the rotatable lens of each eye piece from said position to gradually decrease the light transmission through the eye piece, said means for rotating being directly responsive to a change in the rate of supply of light-and-heat-producing agent through said conducting means to said device to correspondingly vary the amount of light transmitted through the pair of eye pieces to thereby protect the eyes of the operator of the device.

6. In a welding mask operatively associated with an electric arc welding device, a pair of eye pieces operable for gradually varying the light transmission therethrough, means for normally retaining the eye pieces for the maximum transmission of light, a conductor for supplying electric current to the welding device, and an electrical means for operating said eye pieces to gradually decrease the transmission of light therethrough, said electrical means including means directly responsive to the variations in the current flowing through the conductor to the welding device for varying the degree to which said electrical means and the eye pieces are operated.

7. In combination with a metal welding and cutting device which produces intense light effects, a mask for protecting the eyes of the operator of such device from intense light, the mask having a pair of eye pieces operable for varying the light transmission therethrough, means for normally biasing the eye pieces in condition for maximum transmission of light, means for conducting a light-and-heat-producing agent to the light-producing device, and means directly responsive to an increase in the rate of supply of said agent to said device for operating said eye pieces to decrease the light transmission therethrough, said responsive means being adapted and arranged to operate said eye pieces to vary the light transmission through the eye pieces in accordance with the intensity of the light produced by variations in the rate of supply of said agent to the operated device, whereby the operator will have a maximum degree of visibility consistent with the protection of his eyes from the light produced by the operated device.

8. In a combination as defined by claim 7, in which the responsive means includes means for generating an electric current for operating the eye pieces.

CECIL PATRICK MOLYNEUX.

REFERENCES CITED

The following references are of record in the file of this patent:

UNITED STATES PATENTS

| Number | Name | Date |
|---|---|---|
| 1,497,012 | Goodspeed | June 10, 1924 |
| 1,822,308 | Morton | Sept. 8, 1931 |
| 2,064,812 | Bouchard | Dec. 22, 1936 |
| 2,122,923 | Yettner | July 5, 1938 |
| 2,397,009 | Hurley et al. | Mar. 19, 1946 |
| 2,417,883 | Oschin | Mar. 25, 1947 |
| 2,423,320 | Hurley, Jr. | July 1, 1947 |

FOREIGN PATENTS

| Number | Country | Date |
|---|---|---|
| 310,346 | Italy | Aug. 10, 1933 |